United States Patent
Welk et al.

(10) Patent No.: US 6,669,337 B2
(45) Date of Patent: Dec. 30, 2003

(54) PROGRESSIVE SPECTACLE LENS WITH LOW SWAYING EFFECTS

(75) Inventors: Andrea Welk, Munich (DE); Peter Baumbach, Munich (DE); Walter Haimerl, Munich (DE); Herbert Pfeiffer, Muinch (DE); Norbert Awrath, Munich (DE); Gregor Esser, Munich (DE); Helmut Altheimer, Lauchdorf (DE); Rainer Dorsch, Munich (DE); Martin Zimmermann, Klenberghofen (DE); Jochen Brosig, Gruenwald (DE); Werner Mueller, Oetisheim (DE); Martin Wechs, Munich (DE); Stephan Haser, Munich (DE); Winfried Nikolaus, Haar (DE)

(73) Assignee: Optische Werke G. Rodenstock, Munich (DE)

( * ) Notice: Subject to any disclaimer, the term of this patent is extended or adjusted under 35 U.S.C. 154(b) by 0 days.

(21) Appl. No.: 10/280,081

(22) Filed: Oct. 25, 2002

(65) Prior Publication Data

US 2003/0156251 A1 Aug. 21, 2003

Related U.S. Application Data

(63) Continuation of application No. PCT/DE01/01583, filed on Apr. 25, 2001.

(30) Foreign Application Priority Data

| Jan. 17, 2000 | (WO) | PCT/DE01/00188 |
| Apr. 25, 2000 | (DE) | 100 20 244 |
| Apr. 25, 2000 | (DE) | 100 20 243 |
| Apr. 28, 2000 | (DE) | 100 21 047 |

(51) Int. Cl.$^7$ ............................................. G02C 7/06
(52) U.S. Cl. ............................................. 351/169
(58) Field of Search ............................... 351/168, 169

(56) References Cited

U.S. PATENT DOCUMENTS

| 2,878,721 A | 3/1959 | Kanolt |
| 4,606,622 A | 8/1986 | Fueeter et al. |
| 5,784,144 A | 7/1998 | Kelch et al. |
| 5,992,998 A | 11/1999 | Pfeiffer et al. |

FOREIGN PATENT DOCUMENTS

| DE | 196 12 284 A1 | 10/1997 |
| EP | 0 911 672 B1 | 4/1999 |
| EP | 0 677 177 B1 | 6/2001 |

OTHER PUBLICATIONS

International Search Report.

*Primary Examiner*—Scott J. Sugarman
*Assistant Examiner*—Darryl J. Collins
(74) *Attorney, Agent, or Firm*—Crowell & Moring LLP

(57) ABSTRACT

Described is a spectacle lens comprising a region (distance portion) designed for viewing at large distances and in particular "to infinity", a region (near portion) designed for viewing at short distances and in particular "reading distances", and a progressive zone disposed between the distance portion and the near portion, in which the power of the spectacle lens increases from a value at a distance reference point located in the distance portion to a value at the near reference point located in the near portion along a curve (principal line) veering towards the nose. The invention is distinct in that the astigmatic deviation, i.e. the difference between the prescribed and the actual astigmatism along circles having a center lying 4 mm below the centration point and having a diameter of 10 to 40 mm satisfies the following conditions: two local minima occur which on a "right-hand side spectacle lens" are located at 95°±10° (according to TABO) and at 280°±10°, and on a "left-hand side spectacle lens" at 85°±10° and 260°±10°; and two local maxima occur which on both a "right-hand side spectacle lens" and also a "left-hand-side spectacle lens" are located at 215°±10° and 335°±10°.

8 Claims, 9 Drawing Sheets

Astigmatic Deviation

Mean „As Worn" Power

Circle Diameter 10 mm

Circle Diameter 15 mm

Circle Diameter 20 mm

Circle Diameter 25 mm

Astigmatic Deviation

Mean „As Worn" Power

Vertex Heights:

| 0 | -20 | -17.5 | -15 | -12.5 | -10 | -7.5 | -5 | -2.5 | 0 |
|---|---|---|---|---|---|---|---|---|---|
| 20 | 0 | 0 | 0 | 0 | 0 | 0 | 0 | 0 | 1.88114 |
| 17.5 | 0 | 0 | 0 | 0 | 0 | 1.727544 | 1.572749 | 1.476457 | 1.43867 |
| 15 | 0 | 0 | 0 | 1.825893 | 1.556258 | 1.343761 | 1.189465 | 1.093506 | 1.055966 |
| 12.5 | 0 | 0 | 1.827844 | 1.500623 | 1.231244 | 1.019591 | 0.865786 | 0.770078 | 0.732707 |
| 10 | 0 | 0 | 1.558189 | 1.232921 | 0.965089 | 0.754524 | 0.601373 | 0.505935 | 0.468649 |
| 7.5 | 0 | 1.726383 | 1.345574 | 1.022576 | 0.756795 | 0.547868 | 0.39579 | 0.300844 | 0.263672 |
| 5 | 0 | 1.566588 | 1.188478 | 0.868198 | 0.605063 | 0.398525 | 0.248337 | 0.154463 | 0.117588 |
| 2.5 | 0 | 1.459495 | 1.084527 | 0.767617 | 0.508048 | 0.305076 | 0.15802 | 0.066273 | 0.030092 |
| 0 | 1.833183 | 1.402774 | 1.031483 | 0.718726 | 0.463772 | 0.26566 | 0.123183 | 0.035027 | 0.00048 |
| -2.5 | 0 | 1.394456 | 1.027487 | 0.719736 | 0.470458 | 0.278427 | 0.141793 | 0.058484 | 0.026833 |
| -5 | 0 | 1.432945 | 1.070942 | 0.768862 | 0.525984 | 0.340808 | 0.210844 | 0.133162 | 0.105213 |
| -7.5 | 0 | 1.51707 | 1.160674 | 0.864715 | 0.628528 | 0.450405 | 0.32724 | 0.255205 | 0.230946 |
| -10 | 0 | 0 | 1.296365 | 1.00678 | 0.777293 | 0.605921 | 0.488983 | 0.42183 | 0.400599 |
| -12.5 | 0 | 0 | 1.479087 | 1.195879 | 0.972726 | 0.807223 | 0.695213 | 0.631598 | 0.61234 |
| -15 | 0 | 0 | 0 | 1.43296 | 1.214957 | 1.053701 | 0.944992 | 0.883608 | 0.86536 |
| -17.5 | 0 | 0 | 0 | 0 | 0 | 1.344445 | 1.237531 | 1.177299 | 1.159499 |
| -20 | 0 | 0 | 0 | 0 | 0 | 0 | 0 | 0 | 1.494969 |

| 0 | 2.5 | 5 | 7.5 | 10 | 12.5 | 15 | 17.5 | 20 |
|---|---|---|---|---|---|---|---|---|
| 20 | 0 | 0 | 0 | 0 | 0 | 0 | 0 | 0 |
| 17.5 | 1.459338 | 1.538288 | 1.675159 | 0 | 0 | 0 | 0 | 0 |
| 15 | 1.076827 | 1.155872 | 1.292618 | 1.4865 | 1.737064 | 0 | 0 | 0 |
| 12.5 | 0.753727 | 0.832805 | 0.969293 | 1.162491 | 1.41186 | 1.717203 | 0 | 0 |
| 10 | 0.489795 | 0.568789 | 0.704732 | 0.896843 | 1.144544 | 1.447722 | 0 | 0 |
| 7.5 | 0.28482 | 0.36345 | 0.498312 | 0.688619 | 0.933952 | 1.234434 | 1.590531 | 0 |
| 5 | 0.138583 | 0.216248 | 0.349126 | 0.536661 | 0.778744 | 1.075794 | 1.428451 | 0 |
| 2.5 | 0.050725 | 0.126539 | 0.256119 | 0.439446 | 0.677017 | 0.969632 | 1.318088 | 0 |
| 0 | 0.020498 | 0.093392 | 0.218221 | 0.395724 | 0.62728 | 0.914254 | 1.257604 | 1.658066 |
| -2.5 | 0.046199 | 0.115437 | 0.23443 | 0.404667 | 0.628679 | 0.908687 | 1.245883 | 0 |
| -5 | 0.124484 | 0.189993 | 0.302891 | 0.46531 | 0.680802 | 0.952663 | 1.282563 | 0 |
| -7.5 | 0.250899 | 0.313413 | 0.420938 | 0.576172 | 0.783244 | 1.046462 | 1.368183 | 0 |
| -10 | 0.421421 | 0.482323 | 0.585923 | 0.735457 | 0.935213 | 1.190203 | 0 | 0 |
| -12.5 | 0.633866 | 0.694298 | 0.795689 | 0.941459 | 1.135746 | 1.383841 | 0 | 0 |
| -15 | 0.887307 | 0.974892 | 1.048564 | 1.192212 | 1.38304 | 0 | 0 | 0 |
| -17.5 | 1.181572 | 1.242623 | 1.343387 | 0 | 0 | 0 | 0 | 0 |
| -20 | 0 | 0 | 0 | 0 | 0 | 0 | 0 | 0 |

Fig. 10a

PROGRESSIVE SPECTACLE LENS WITH LOW SWAYING EFFECTS

CROSS REFERENCE TO RELATED APPLICATIONS

The present application is a continuation of International Patent Application No. PCT/DE01/01583, filed Apr. 25, 2001, designating the United States of America, the entire disclosure of which is incorporated herein by reference. Priority is claimed based on German Patent Application No. 100 20 243.8, filed Apr. 25, 2000; German Patent Application No. 100 20 244.6, filed Apr. 25, 2000; German Patent Application No. 100 21 047.3, filed Apr. 28, 2000; and International Patent Application No. PCT/DE01/00188, filed Jan. 17, 2001.

FIELD OF THE INVENTION

The invention relates to a progressive spectacle lens as set out in the preamble of patent claim 1, the lens having low swaying effects.

Progressive spectacle lenses (also called varifocal lenses, multifocal lenses etc.) are usually understood to be spectacle lenses having a different (lower) power in the region through which a spectacles wearer views an object located at a great distance—hereunder referred to as a distance portion—than in the region (near portion) through which the spectacles wearer views a near object. Located between the distance portion and the near portion is the so-called progressive zone in which the power of the spectacle lens continuously increases from that of the distance portion to that of the near portion. The magnitude of the power increase is also designated as addition power.

As a rule, the distance portion is located in the upper part of the spectacle lens and designed for viewing "to infinity", whilst the near portion is located in the lower region and is particularly designed for reading. In spectacles for special application—those for pilots or for monitor work stations are mentioned as examples—the distance and near portions may also be arranged differently and/or designed for other distances. Furthermore, it is possible for a plurality of near portions and/or distance portions and suitable progressive zones to be present.

With progressive spectacle lenses having a constant refractive index it is necessary, in order that the power may increase between the distance portion and the near portion, that the curvature of one or both surfaces continuously change from the distance portion to the near portion.

The surfaces of spectacle lenses are usually characterized by the so-called principal radii of curvature R1 and R2 at every point on the surface. (Sometimes also the so-called principal curvatures K1=1/R1 and K2=1/R2 are given instead of the principal radii of curvature.) Together with the refractive index n of the glass material, the principal radii of curvature govern the parameters frequently used for an ophthalmologic characterization of a surface:

Surface power=$0.5 \cdot (n-1) \cdot (1/R1+1/R2)$

Surface astigmatism=$(n-1) \cdot (1/R1-1/R2)$.

Surface power is the parameter via which an increase of power from the distance portion to the near portion is achieved. Surface astigmatism (more clearly termed cylinder power) is a "troublesome property", because an astigmatism—inasmuch as an eye does not have an innate astigmatism to be corrected—which exceeds a value of about 0.5 dpt results in an indistinctly perceived image on the retina.

BACKGROUND OF THE INVENTION

Although any change of the curvature of the surface which is needed to achieve a surface power increase without vision being "disturbed" by surface astigmatism can be attained relatively simply along a (plane or winding) line, considerable "intersections" of surfaces will result alongside this line, leading to a large surface astigmatism which more or less impairs the lens in regions alongside the mentioned line.

On a surface having a surface power increasing from the distance portion to the near portion it is therefore not possible for reasons of surface theory to "maintain" the regions alongside a line (that is free from astigmatism or exhibits a predetermined astigmatism) free from physiologically disturbing surface astigmatism (Minkwitz Law).

Because the curvature in the distance portion must not change, it is relatively simple to design the distance portion of the progressive surface in such manner that the distance portion has a very small surface astigmatism (<0.5 dpt) or even a surface astigmatism value of "0" within a large region. On the other hand, the "quality" of the shaping of the regions lateral to the transition region is of decisive importance for the acceptability of the spectacle lens to the spectacle wearer concerned.

The basic object in designing every progressive spectacle lens is therefore to shape the lateral regions within the transition zone, and also the lateral regions of the near portion if necessary, so that the spectacle lens will be as acceptable as possible to the spectacle wearer—without any unacceptable impairment of the distance portion.

In order to achieve this basic object, the designing of a progressive spectacle lens surface contributing to power change has in the past started out from a line lying or winding in a plane—also designated as a principal meridian or a principal line—as a "backbone for the design of the surface". This line runs centrally along the surface from top to bottom, and its course approximately follows the points of penetration of the rays of sight through the spectacle lens surface during a movement, in particular a lowering, of the glance. The principal curvatures at each point on this line were chosen in such manner that the desired increase of surface power (also designated as addition power) from the distance portion to the near portion is achieved. Starting out from this line, the lateral regions of the surface were then (more or less) suitably computed.

For the shaping of the lateral regions a number of solutions have become known. During the early days of the computation of progressive spectacle lenses a purely surface-theoretical optimization of exclusively the progressive surface was performed, in which the foremost concern was that of substantially reducing as far as possible the disturbing surface astigmatism, or "displacing" the surface astigmatism into the lateral lower regions of the spectacle lens.

Typical of this manner of proceeding are the progressive surfaces for spectacle lenses known from U.S. Pat. No. 2,878,721 or DE-AS 20 44 639, in which—provided that the progressive surface is the front surface—the curvatures of intersections of the progressive surface with plane surfaces which extend horizontally (horizontal meridians) or are perpendicular to the principal meridian (orthogonal meridians) are conic sections or curves of higher order, the curvatures of which increase in the distance portion and decrease in the near portion. The transition between the increase of curvature of the meridians in the distance portion and the decrease in the near portion occurs in the progressive zone.

This manner of proceeding results in the power difference and therewith also the surface intersections being reduced in the lateral regions. However, it is of disadvantage that because of the reduction of the power difference in the lateral regions, it becomes difficult to achieve an oriented view through the edge region and—depending on the design—very disturbing swaying sensations are experienced when looking through the lateral regions. Furthermore, the surface power along horizontal meridians changes relatively strongly.

For this reason it was proposed in DE-Patent 28 14 936 that the curvature in the distance portion or in the near portion be allowed to decrease or increase only in a strip on both sides of the principal meridian, and that the change of curvature be reversed outside this strip.

However, common to all of these approaches is a purely surface-related optimization of the progressive surface. This purely surface-related approach can be found also in more recent patent publications, such as DE-C-42 38 067 or DE-C-43 42 234.

In the last-mentioned publication an approach is described in which certain conditions for the gradient of the surface astigmatism and the surface power must be maintained. Irrespective of the circumstance that these gradients are not at all defined, for example when the surface is described by means of cubic splines, this purely surface-related optimization also disregards certain physiological requirements.

Approaches made to optimize the progressive surface in a wearing position are described in EP-A-677 177, U.S. Pat. No. 4,606,622 and DE 196 12 284.

For computing a progressive surface in the wearing position, a wearing situation is established. This relates either to a particular user for whom the individual parameters have been specially determined in the respective wearing situation and the progressive surface has been separately computed and fabricated, or to average values as described for example in DIN 58 208 Part 2.

However, even the known spectacle lenses which have been computed for the wearing position still have a number of disadvantages:

Thus, with the progressive surfaces known from U.S. Pat. No. 4,606,622, peaks are present along the course of lines of equal surface astigmatism for the lines having a surface power value of 5 dpt and 7 dpt.

Possibly the reason for this may be that a mixed use has been made of surface related and wearing position related approaches in the computation.

DE-A-196 12 284 deals with a decrease of the mean power close towards the periphery. This is an inadequate approach, because also in the distance portion the power should not increase excessively towards the periphery. Primarily, however, because of the stipulations which are one-sidedly related to the near-portion, swaying sensations are evoked, particularly with rotating movements of glance.

In EP-A-0 911 672 the course of the mean power along a circle having a diameter of 40 mm is given. In this, the mean power, i.e. a surface-related parameter, has a global minimum and a global maximum. Even with such surfaces comparatively strong swaying sensations arise.

DESCRIPTION OF THE INVENTION

The invention is based on the object of further developing a progressive spectacle lens as set out in the preamble of the patent claim 1 in such manner that it will not only have a large distance portion and a large near portion, but also that swaying sensations are avoided, particularly upon rotating movements of glance.

Achievements of this object by the invention are characterized in claims 1 and 5.

According to the present invention no surface values are taken into account, but only parameters which relate to the wearing position, namely the deviation from a given astigmatism (which is 0 dpt for an astigmatism-free eye, or has the magnitude and cylinder axis of cylinder prescription values), and the mean "as worn" power D as a measure of the "power" of the spectacle lens.

The mean "as worn" power D is the mean value of the reciprocals of the image side focal intercepts S' minus the object distance, i.e. the object side focal intercept S, as given by $$D=0.5 \cdot (S'1+S'2)-S$$

S'=reciprocal of the image side focal intercept
S=reciprocal of the object side focal intercept.

According to the invention it has been realized that the cause of the swaying movements perceived as being extremely disturbing by spectacle wearers is precisely the smooth variation of the mean power along a circle having a diameter of 40 mm, which is to be achieved in EP-A-911 672 and which results in only one global maximum and one global minimum.

For this reason the spectacle lens of the invention, which is the first achievement of the object, is designed in such manner that the astigmatic deviation, i.e. the difference between the prescribed and the actual astigmatism along circles having a center lying 4 mm below the centration point, and having a diameter of 10 to 40 mm, fulfils the following conditions:

two local minima occur which on a "right-hand side spectacle lens" are located at 95°±10° (according to TABO) and at 280°±10°, and on a "left-hand side spectacle lens" at 85°±10° and 260°±10°, and two local maxima occur which on both a "right-hand side spectacle lens" and also a "left-hand-side spectacle lens" are located at 215°±10° and 335°±10°.

It is particularly preferred when the astigmatic deviation has exactly two local minima and maxima. Furthermore, it is of advantage when the values of both minima are less than 0.15 dpt.

In particular, the values of both maxima may differ by not more than 0.2 dpt and may each be smaller than 1.2·Add.

With an alternative or cumulative achievement of object provided by the invention, the mean "as worn" power along circles having a center lying 4 mm below the centration point and a diameter of 10 to 40 mm fulfils the following conditions:

for each diameter a global minimum occurs at 90°±10° (according to TABO) and a global maximum at 280°±10°, for diameters less than 16 mm, the global minima and maxima also are the only local minima and maxima, for a diameter of 40 mm a local minimum and a local maximum occur on both the nasal and the temporal side.

Furthermore, it is preferred when for diameters between 14 and 26 mm saddle points are formed at 200°±15° and at 355°±15°, wherein with increasing diameter these saddle points merge to become local minima or maxima, respectively. The local minima may be located at 215°±15° and 340°±15°, and the local maxima at 200°±15° and 355°±15°.

BRIEF DESCRIPTION OF THE DRAWINGS

In the following the invention will be described by way of example without limitation of the general inventive concept, with the aid of embodiments with reference to the drawings to which attention is expressly drawn concerning the disclosure of all details of the invention not described more explicitly in the text.

Shown by

FIG. 10a are the vertex heights of the progressive surface of a concrete embodiment;

DESCRIPTION OF AN EXAMPLE OF EMBODIMENT

In all Figures the abscissa (x axis) is the horizontal axis and the ordinate (y axis) is the vertical axis in a wearing position.

FIGS. 1 to 7 show the following parameters along circles having diameters of 10, 15, 20, 25, 30, 35 and 40 mm around a point lying 4 mm below the so-called centration point:

1. the course of the mean "as worn" powers in dpt:
   solid curve D, left-hand lettering on the left-hand ordinate;
2. the cylinder axis of the astigmatic deviation in degrees:
   second solid curve, left-hand lettering on the right-hand ordinate;
3. the astigmatic deviation in dpt:
   dash-dotted curve, right-hand lettering on the right-hand ordinate.

Figure 1:
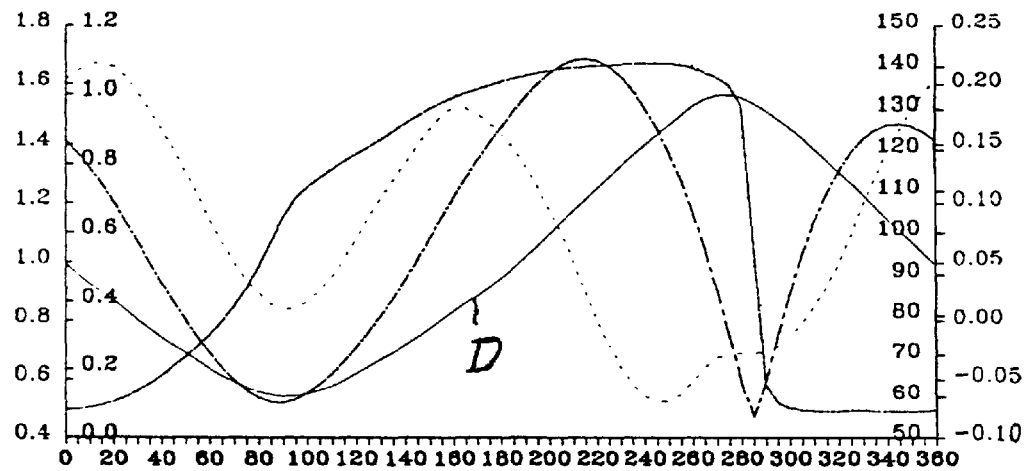
FIGS. 1 to 7 is the course of the astigmatic deviation and the mean "as worn" power along circles having a diameter of 10 to 40 mm.
Figure 2:
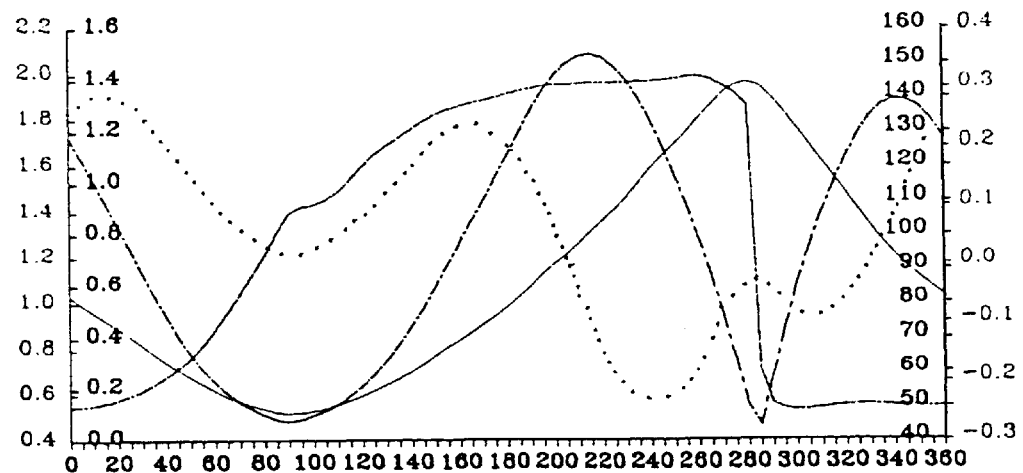
Figure 3:
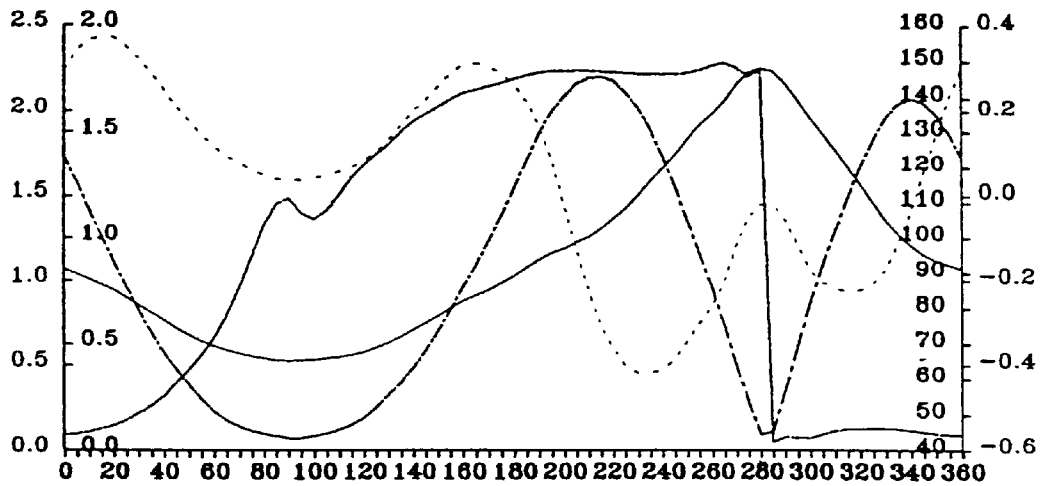
Figure 4:
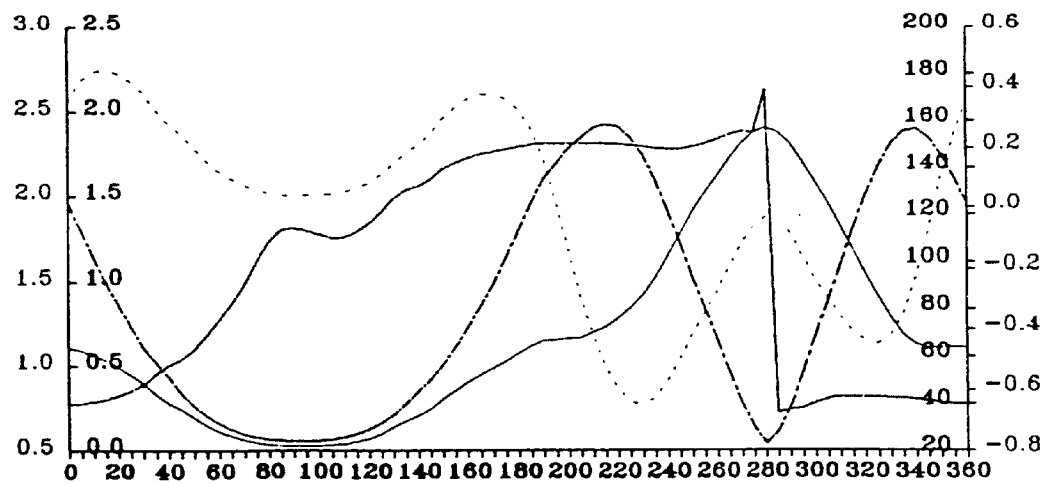
Figure 5:
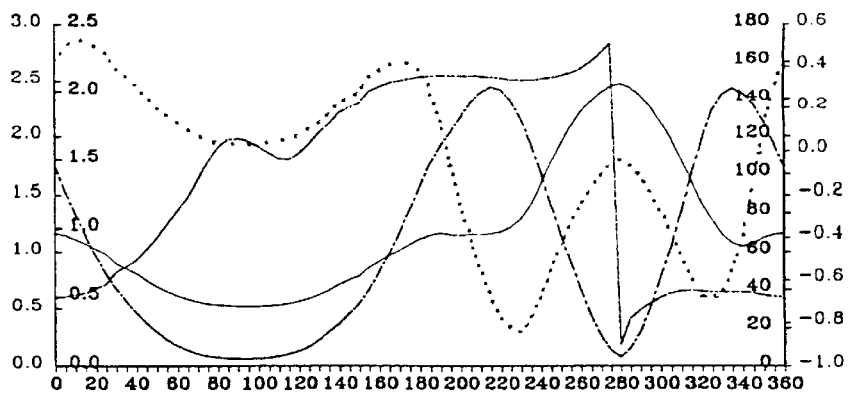
Figure 6:
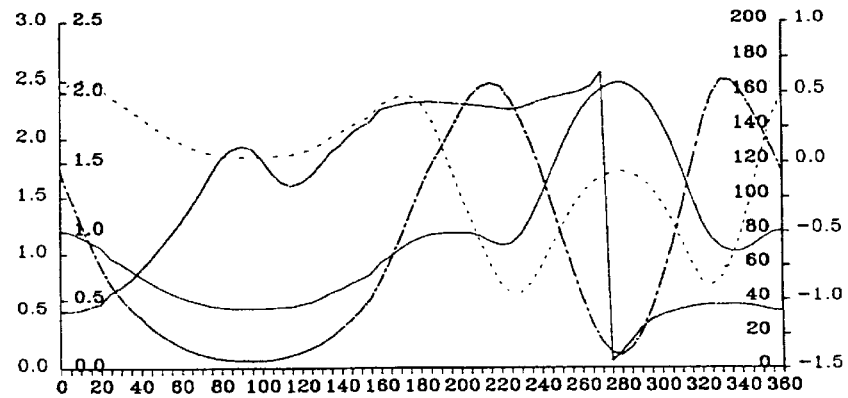
Figure 7:
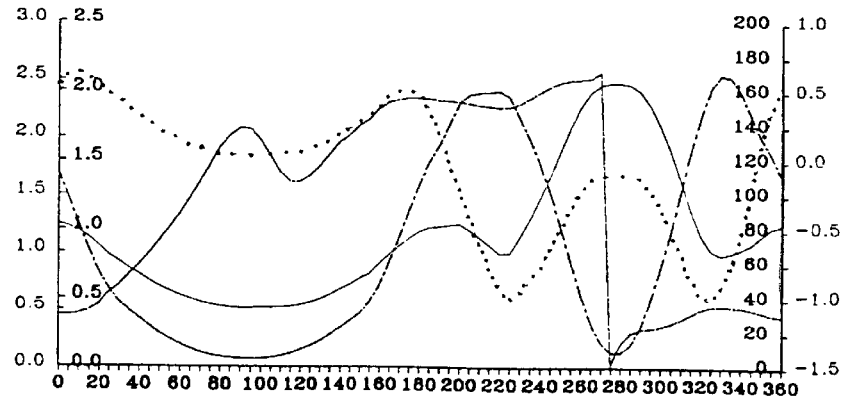
Figure 8:
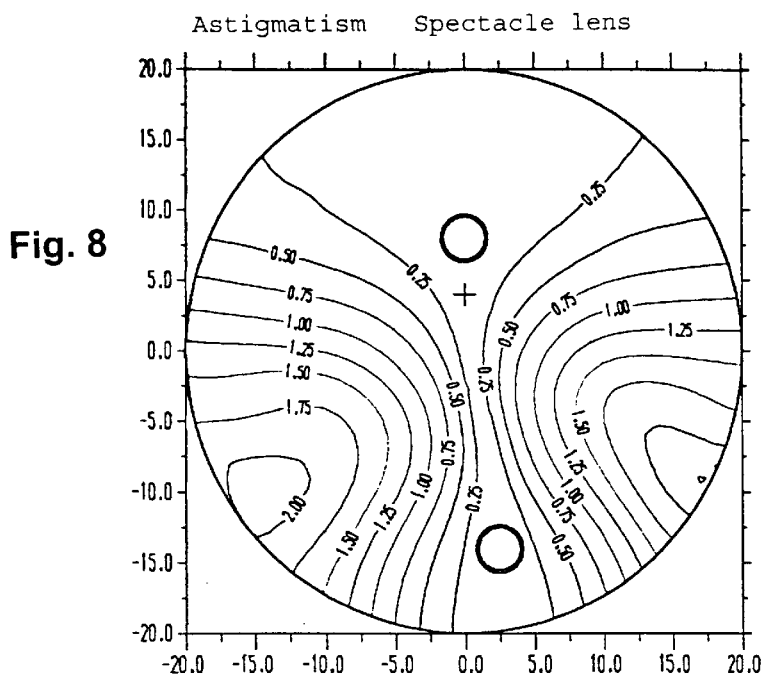
FIG. 8 are the iso-lines of the astigmatic deviation for a spectacle lens according to the invention.
Figure 9:
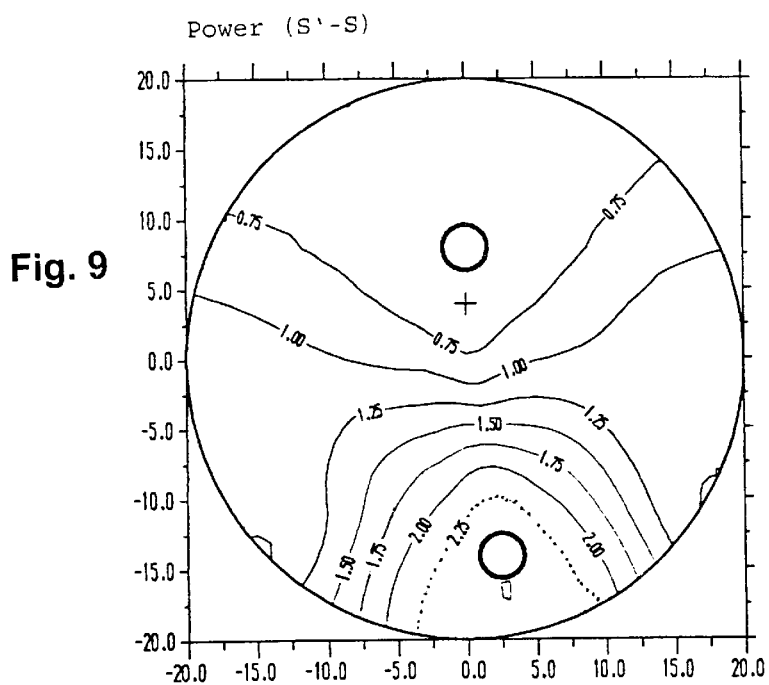
FIG. 9 are the iso-lines of the mean "as worn" power for this spectacle lens.

FIGS. 8 and 9 show the astigmatic deviation and the mean "as worn" power of this embodiment of the invention within a circle having a radius of 20 mm around a point lying 4 mm below the so-called centration point. The distance reference point and the near reference point are indicated by circles; their positions may be seen from the respective Figures.

In FIG. 8 the so-called astigmatic deviation, i.e. the residual astigmatism of the system spectacle lens/eye is represented by means of so-called iso-lines beginning with the iso-line 0.25 dpt. The iso-lines indicate the deviation of the astigmatism with respect to magnitude and cylinder axis from the cylindrical prescription—which in the case of an astigmatism-free eye is 0 dpt.

In FIG. 9 the mean "as worn" power D, i.e. the mean value of the reciprocals of the image side focal intercepts S'1 and S'2 minus the object distance which is the object side focal intercept S, as given by $$D = 0.5 \cdot (S'1 + S'2) - S$$

is also shown in the form of so-called iso-lines beginning with the iso-line 0.75 dpt.

FIGS. 8 and 9 show that both the distance portion and the near portion are relatively large. Furthermore, the mean "as worn" power hardly increases towards the periphery in the distance portion, and decreases only slightly in the near portion. The maximum astigmatic deviation is very small, the difference between the nasal and temporal maximum deviation being insignificant.

The concrete embodiment illustrated in FIG. 10 has a spherical power (mean "as worn" power) of −1 dpt and an addition power A of 2 dpt at the distance reference point. An astigmatic description is not present. In all Figures the abscissa (x axis) is the horizontal axis and the ordinate (y axis) is the vertical axis in a wearing position.

The distance and near reference points are each represented by circles in FIGS. 10b–e and the centration point is designated by a cross—their positions may be seen from the Figures. Furthermore, the course of the principal meridian has been drawn-in.

The partial Figures a show the vertex heights of the progressive eye-side surface for the embodiment. Vertex height is understood to be the distance of a point having the coordinates x and y (horizontal and vertical axis, respectively, in the wearing position of the spectacle lens) from the tangential plane of the surface vertex. In the Table each left-hand column shows the y values (from −20 to +20 mm) and the top line from column 2 onwards shows the x values (from −20 to +20 mm). The vertex heights are also given in millimeters. The value 0 means that no vertex height is given for these x,y coordinates.

Figure 10B:
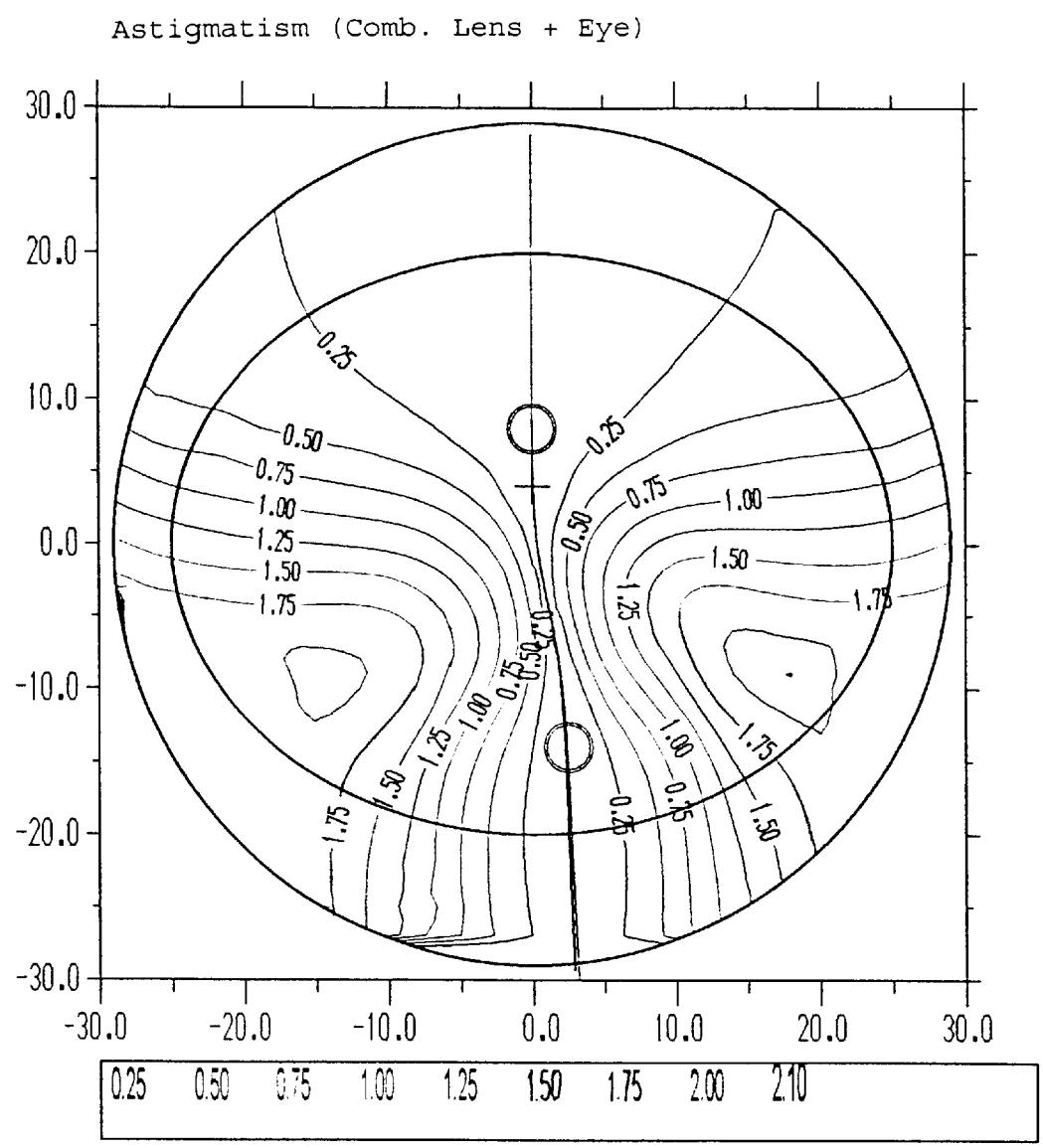
FIG. 10b are the iso-lines of the astigmatic deviation.

The partial FIG. 10b shows the astigmatic deviation within a circle having a radius of 30 mm around a point lying 4 mm below the so-called centration point. The astigmatic deviation is the "residual astigmatism" of the system spectacle lens/eye and is shown by so-called iso-lines beginning with the iso-line 0.25 dpt. The iso-lines show the deviation of the astigmatism with respect to magnitude and cylinder axis from the cylindrical prescription—which in the case of an astigmatism-free eye is 0 dpt.

Figure 10C:
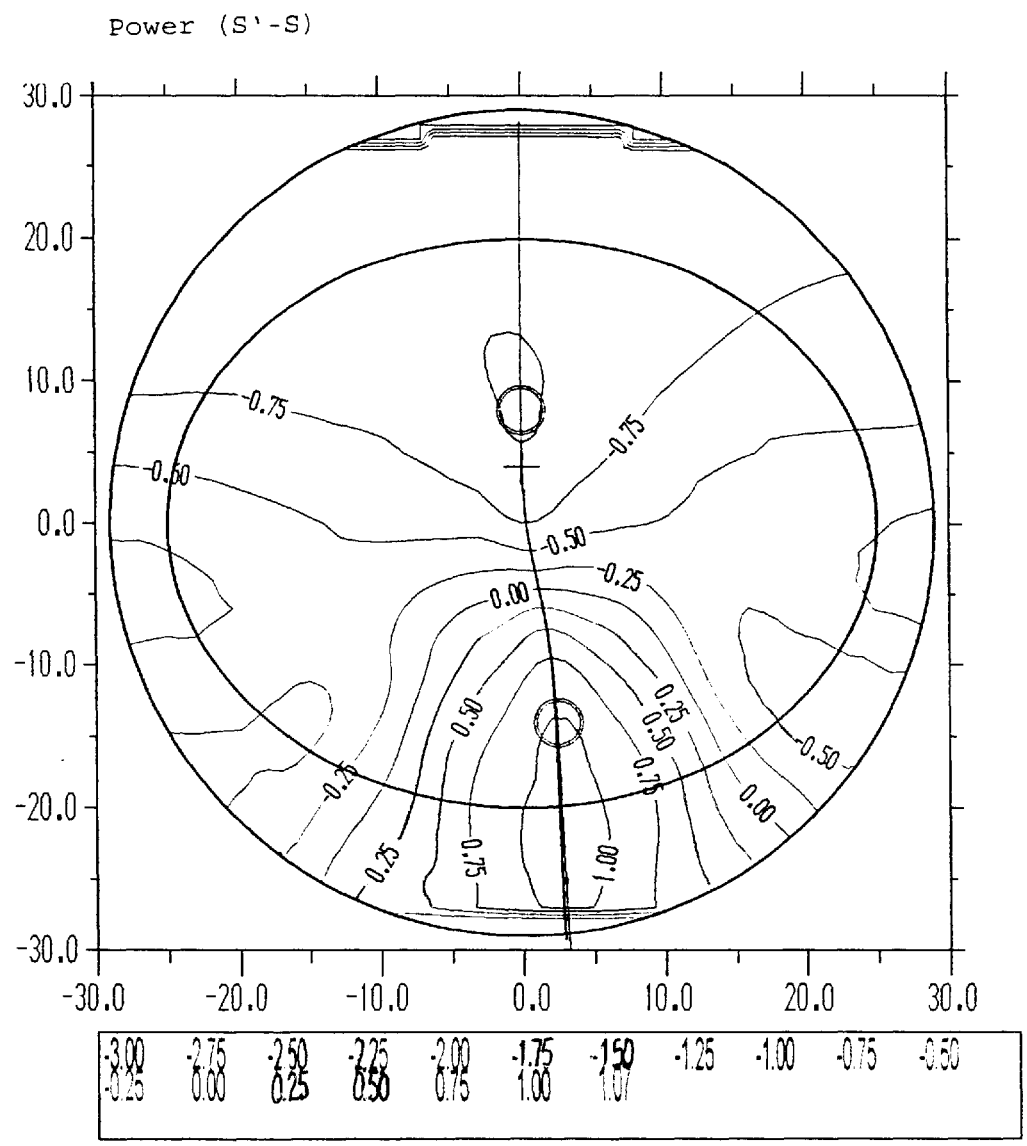
FIG. 10c are the iso-lines of the mean "as worn" power.

The partial FIG. 10c correspondingly shows the iso-lines for the mean "as worn" power of this embodiment. The mean "as worn" power D is the mean value of the reciprocals of the image side focal intercepts S'1 and S'2 minus the object distance which is the object side focal intercept S, as given by $$D = 0.5 \cdot (S'1 + S'2) - S$$

and is also illustrated in the form of so-called iso-lines beginning with the iso-line 0.75 dpt.

Figure 10D:
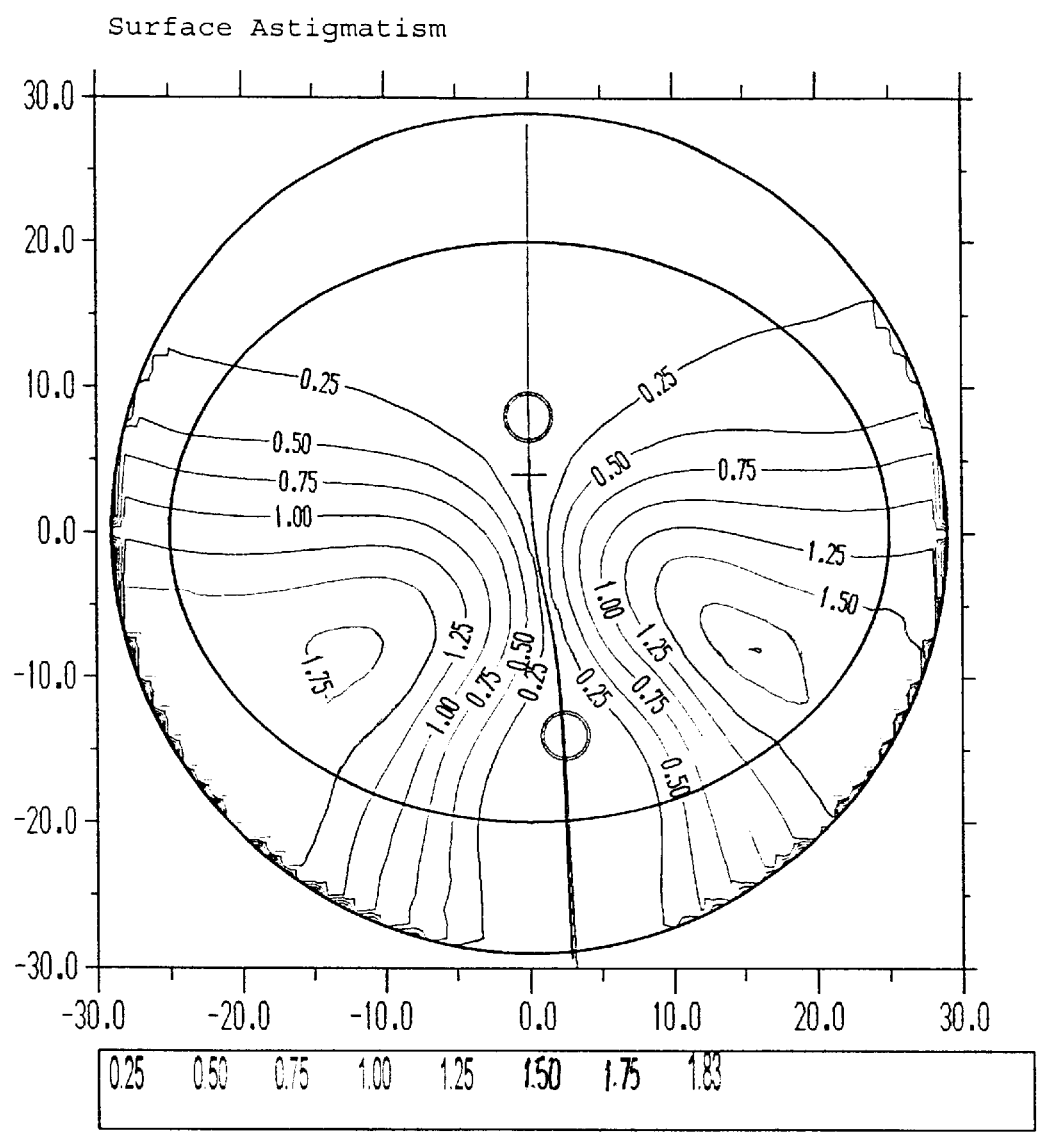
FIG. 10d are the iso-lines of the surface astigmatism.
Figure 10E:
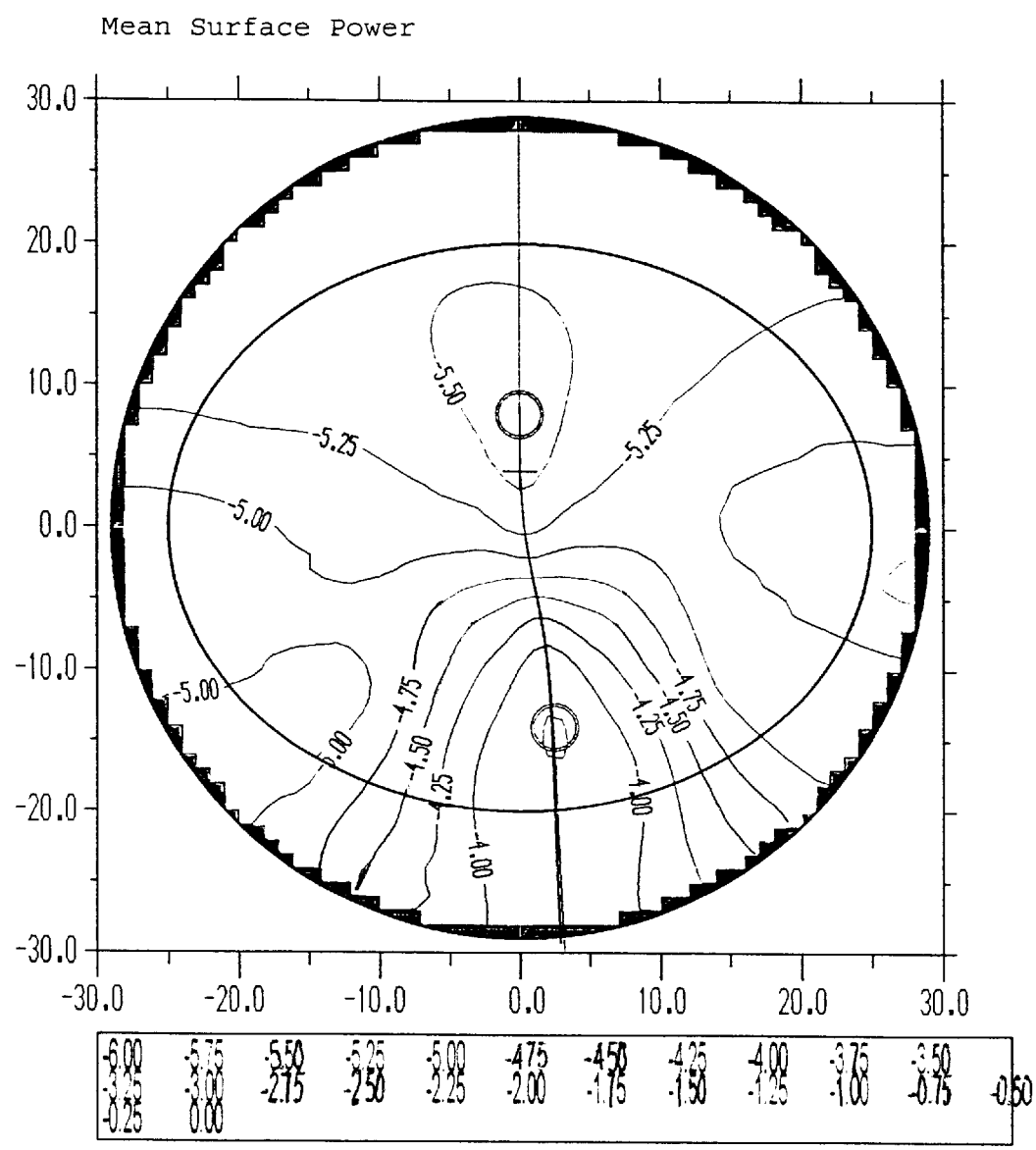
FIG. 10e are the iso-lines of the mean surface power for this embodiment.

In corresponding manner the iso-lines of the surface data, namely the surface astigmatism and the mean surface power, are shown in partial FIGS. 10d and 10e. For a definition of these surface data attention is drawn to the introductory explanations.

The embodiment shown in FIG. 10 has the following individualized conditions of wearing:

| | |
|---|---|
| D1x | 4.55 |
| D1y | 4.55 |
| n | 1.597 |
| d | 1.59 |
| DRP | 1.0 |
| PD | 63 |
| HSA | 15 |
| Pantoscopic Angle | 0 | wherein:

D1x is the surface power of the front surface in x direction (dpt)

D1y is the surface power of the front surface in y direction (dpt)

n is the refractive index of the glass material d is the center thickness of the lens in mm DRP is the prism thinning in cm/m PD is the interpupillary distance HSA is the vertex distance in mm The pantoscopic angle of the spectacle lens is given in degrees.

Of course, the features of the invention may also be used for computing and manufacturing spectacle lenses having two progressive surfaces and/or having (in addition) a varying refractive index.

What is claimed is:

1. Spectacle lens comprising a region (distance portion) designed for viewing at large distances and in particular "to infinity";

a region (near portion) designed for viewing at short distances and in particular "reading distances"; and a progressive zone disposed between the distance portion and the near potion, in which a power of the spectacle lens increases from a value at a distance reference point located in the distance portion to a value at a near reference point located in the near portion along a curve (principal line) veering towards a nose;

wherein an astigmatic deviation, i.e. a difference between a prescribed and an actual astigmatism along circles having a center lying 4 mm below a centration point and having a diameter of 10 to 40 mm satisfies the following conditions:

two local minima occur which on a "right-hand side spectacle lens" are located at 95°±10° (according to TABO) and at 280°±10°, and on a "left-hand side spectacle lens" at 85°±10° and 260°±10°; and two local maxima occur which on both a "right-hand side spectacle lens" and also a "left-hand-side spectacle lens" are located at 215°±10° and 335°±10°.

2. Spectacle lens according to claim 1, wherein exactly two local minima and maxima occur.

3. Spectacle lens according to claim 1, wherein the values of both minima are smaller than 0.15 dpt.

4. Spectacle lens according to claim 1, wherein the values of both minima do not differ by more than 0.2 dpt and are each smaller than 1.2·Add.

5. Spectacle lens according to claim 1, wherein a mean "as worn" power along circles having a center lying 4 mm below the centration point and having a diameter of 10 to 40 mm fulfils the following conditions:

for each diameter a global minimum occurs at 90°±10° (according to TABO) and a global maximum at 280°±10°, for diameters less than 16 mm, the global minima and maxima are also the only local minima and maxima, for a diameter of 40 mm a local minimum and a local maximum occurs on both the nasal and the temporal side.

6. Spectacle lens according to claim 1, wherein for diameters between 14 and 26 mm saddle points are formed at 200°±15° and at 355°±15°.

7. Spectacle lens according to claim 6, wherein with increasing diameter the saddle points merge to form local minima or maxima.

8. Spectacle lens according to claim 7, wherein the local minima are located at 215°±15° and 340°±15° and the local maxima at 200°±15° and 355°±15°.

* * * * *